United States Patent
Shuck et al.

(10) Patent No.: US 11,707,788 B2
(45) Date of Patent: Jul. 25, 2023

(54) FUSED FILAMENT FABRICATION OF VACUUM INSULATOR

(71) Applicants: Rolls-Royce Corporation, Indianapolis, IN (US); Rolls-Royce North American Technologies, Inc., Indianapolis, IN (US)

(72) Inventors: Quinlan Yee Shuck, Indianapolis, IN (US); Scott Nelson, Carmel, IN (US); Raymond Ruiwen Xu, Carmel, IN (US); Brandon David Ribic, Noblesville, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 202 days.

(21) Appl. No.: 17/098,019

(22) Filed: Nov. 13, 2020

(65) Prior Publication Data

US 2021/0146441 A1    May 20, 2021

Related U.S. Application Data

(60) Provisional application No. 62/935,537, filed on Nov. 14, 2019.

(51) Int. Cl.
*B22F 10/18* (2021.01)
*B33Y 10/00* (2015.01)
(Continued)

(52) U.S. Cl.
CPC .............. *B33Y 80/00* (2014.12); *B22F 10/18* (2021.01); *B22F 10/85* (2021.01); *B29C 64/165* (2017.08);
(Continued)

(58) Field of Classification Search
CPC ......... B22F 10/18; B22F 10/85; F16L 59/065; B33Y 10/00; B29C 64/393; B29C 64/165
See application file for complete search history.

(56) References Cited

U.S. PATENT DOCUMENTS

| | | |
|---|---|---|
| 4,602,679 A | 7/1986 | Edelstein et al. |
| 7,028,760 B2 | 4/2006 | Dussinger et al. |

(Continued)

FOREIGN PATENT DOCUMENTS

| | | |
|---|---|---|
| EP | 3363563 A1 | 8/2018 |
| EP | 34707365 A1 | 4/2019 |
| WO | 2018067918 A2 | 4/2018 |

OTHER PUBLICATIONS

Hacopian et al., "Technical Challenges with 3D Printing Heat Shields," NASA Slideshow, Aug. 28, 2018, 11 pp.

(Continued)

*Primary Examiner* — Michael P Wieczorek
(74) *Attorney, Agent, or Firm* — Shumaker & Sieffert, P.A.

(57) ABSTRACT

In some examples, an additive manufacturing technique for forming a vacuum insulator. For example, a method including forming an article including a first layer, a second layer, and at least one support member extending between the first and second layer by depositing a filament via a filament delivery device, wherein the filament includes a sacrificial binder and a powder, and wherein the first layer, second layer, and at least one support member define an open cavity within the article; removing the binder; and sintering the article to form the vacuum insulator, wherein the vacuum insulator defines a vacuum environment in the cavity.

20 Claims, 4 Drawing Sheets

(51) Int. Cl.

| | |
|---|---|
| *B29C 64/165* | (2017.01) |
| *B29C 64/393* | (2017.01) |
| *B22F 10/85* | (2021.01) |
| *F16L 59/065* | (2006.01) |
| *B33Y 50/02* | (2015.01) |
| *B29K 505/00* | (2006.01) |
| *B33Y 80/00* | (2015.01) |
| *B33Y 30/00* | (2015.01) |

(52) U.S. Cl.
CPC ............ *B29C 64/393* (2017.08); *B33Y 10/00* (2014.12); *B33Y 30/00* (2014.12); *B33Y 50/02* (2014.12); *F16L 59/065* (2013.01); *B29K 2505/00* (2013.01)

(56) References Cited

U.S. PATENT DOCUMENTS

| | | | |
|---|---|---|---|
| 7,602,679 | B2 | 10/2009 | Ohta et al. |
| 9,815,118 | B1* | 11/2017 | Schmitt .................. B33Y 30/00 |
| 10,562,226 | B1 | 2/2020 | Cohen et al. |
| 10,857,730 | B1 | 12/2020 | Cohen et al. |
| 11,014,162 | B2 | 5/2021 | Hofmann |
| 11,045,912 | B2 | 6/2021 | Alahyari et al. |
| 11,122,706 | B2 | 9/2021 | Jeffers |
| 11,529,685 | B2 | 12/2022 | Kritchman et al. |
| 2005/0145374 | A1 | 7/2005 | Dussinger et al. |
| 2014/0008374 | A1* | 1/2014 | Lubart ............... B65D 81/3823 220/592.2 |
| 2015/0064047 | A1 | 3/2015 | Hyde et al. |
| 2015/0080495 | A1 | 3/2015 | Heikkila |
| 2016/0177829 | A1 | 6/2016 | Loebig et al. |
| 2016/0214176 | A1 | 7/2016 | Bruck et al. |
| 2017/0102194 | A1 | 4/2017 | Choi et al. |
| 2018/0172369 | A1 | 6/2018 | Rhoden et al. |
| 2018/0281283 | A1 | 10/2018 | Frechman et al. |
| 2018/0339342 | A1 | 11/2018 | Hofmann |
| 2019/0077715 | A1 | 3/2019 | Alessi et al. |
| 2019/0110357 | A1 | 4/2019 | Gavagnin et al. |
| 2019/0178585 | A1 | 6/2019 | de Bock et al. |
| 2019/0217525 | A1 | 6/2019 | Mark et al. |
| 2019/0387643 | A1 | 12/2019 | Jeffers |
| 2020/0047252 | A1 | 2/2020 | Kritchman et al. |
| 2020/0248014 | A1 | 8/2020 | Bougher et al. |
| 2020/0316684 | A1 | 10/2020 | Shuck |
| 2020/0398385 | A1 | 12/2020 | Alahyari et al. |

OTHER PUBLICATIONS

Mulholland et al., "Design and Additive Manufacturing of a Composite Crossflow Heat Exchanger," Solid Freeform Fabrication 2017: Proceedings of the 28th Annual International Solid Freeform Fabrication Symposium, Aug. 2017, 9 pp.

Ameli et al., "Advanced 3D Printed Heat Pipes for space applications," Heat Exchanger Action Group (HEXAG) meeting, Thermacore Europe, May 22, 2013, 37 pp.

"Standard Heat Pipes," Retrieved from https://myheatsinks.com/heat-pipe-solutions/standard-heat-pipes/ on Oct. 24, 2019, 6 pp.

Jafari et al., "Metal 3D-Printed Wick Structures for Heat Pipe Application: Capillary Performance Analysis," Applied Thermal Engineering, vol. 143, Jul. 22, 2018, pp. 403-414.

Norfolk et al., "3D Printing Dissimilar Metals Improves Thermal Performance," fabrisonic.com, Sep. 5, 2018, 4 pp.

Mulholland et al., "Filled Thermoconductive Plastics for Fused Filament Fabrication," Solid Freeform Fabrication 2016: Proceedings of the 27th Annual International Solid Freeform Fabrication Symposium, Aug. 2016, 14 pp.

Iftikhar, "Fabrisonic's 3D Metal Printed Heat Exchanger Gets Green-Light From NASA," 3dprintingindustry.com, Aug. 13, 2018, 4 pp.

U.S. Appl. No. 17/097,843, filed Nov. 13, 2020, by Shuck et al.
U.S. Appl. No. 17/097,924, filed Nov. 13, 2020, by Shuck et al.

* cited by examiner

FUSED FILAMENT FABRICATION OF VACUUM INSULATOR

This application claims the benefit of U.S. Provisional Patent Application No. 62/935,537, titled, "FUSED FILAMENT FABRICATION OF VACUUM INSULATOR", filed Nov. 14, 2019, the entire content of which is incorporated by reference herein.

TECHNICAL FIELD

The disclosure relates to additive manufacturing techniques, in particular, to additive manufacturing of vacuum insulators.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

The disclosure describes example techniques, systems, materials, and compositions for additively manufacturing vacuum insulators using fused filament fabrication (FFF).

In some examples, the disclosure describes a method of forming a vacuum insulator, the method comprising forming an article including a first layer, a second layer, and at least one support member extending between the first and second layer by depositing a filament via a filament delivery device, wherein the filament includes a sacrificial binder and a powder, and wherein the first layer, second layer, and at least one support member define an open cavity within the article; removing substantially all the binder; and sintering the article to form the vacuum insulator, wherein the vacuum insulator defines a substantially vacuum environment in the cavity.

In some examples, the disclosure describes an additively manufactured vacuum insulator comprising: a first layer; a second layer; at least one support member extending between the first and second layer, wherein a cavity is between the first layer and the second layer, wherein a substantially vacuum environment is defined in the cavity.

In some examples, the disclosure additive manufacturing system comprising a substrate defining a major surface; a filament delivery device; and a computing device configured to control the filament delivery device to form an article including a first layer, a second layer, and at least one support member extending between the first and second layer, wherein the filament includes a sacrificial binder and a powder, and wherein the first layer, second layer, and at least one support member define an open cavity within the article; wherein the binder is configured to be removed from the article, and the article sintered to form a vacuum insulator, wherein the vacuum insulator defines a vacuum environment in the cavity.

The details of one or more examples are set forth in the accompanying drawings and the description below. Other features, objects, and advantages will be apparent from the description and drawings, and from the claims.

DETAILED DESCRIPTION

Figure 1:
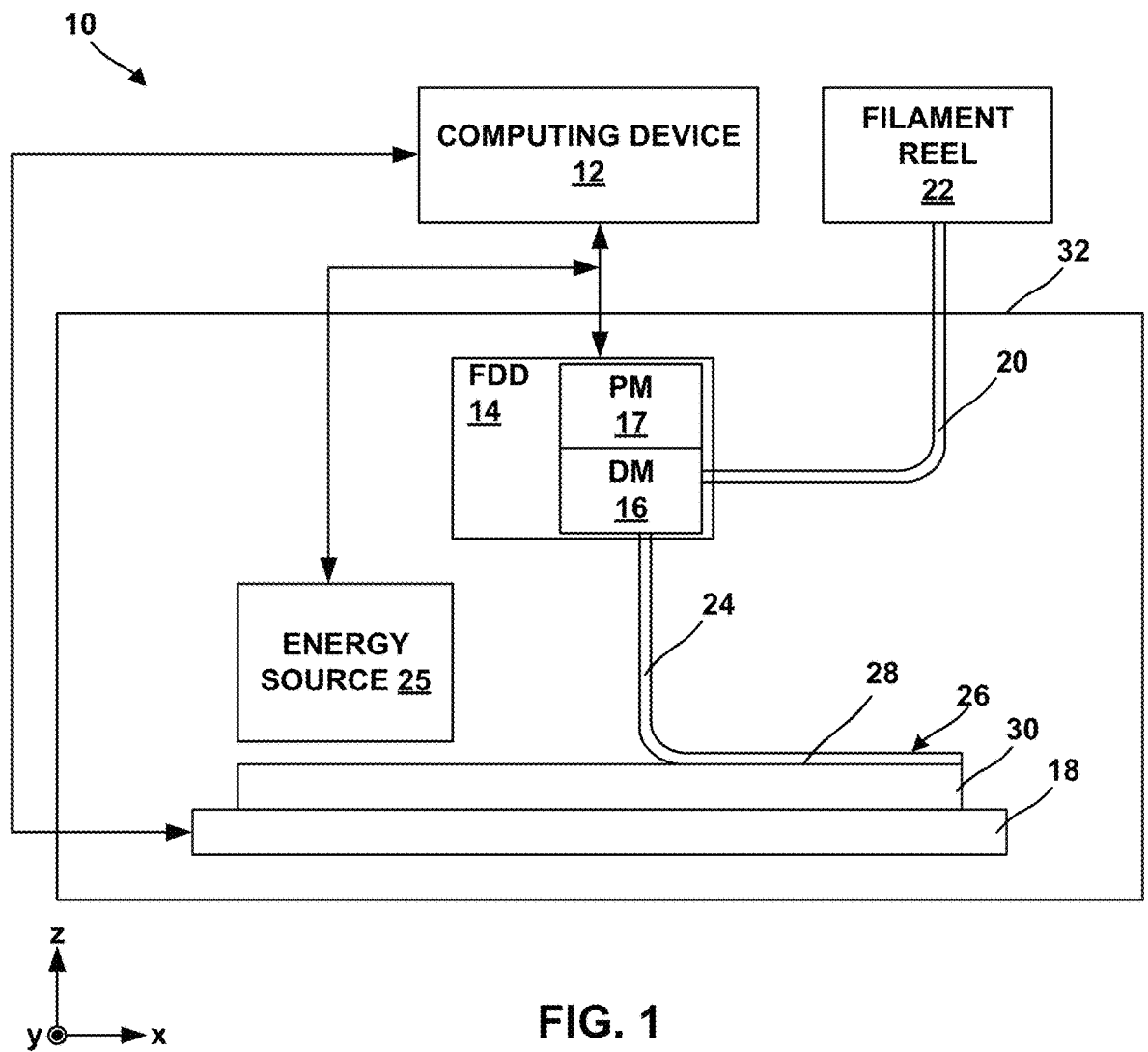
FIG. 1 is a conceptual block diagram illustrating an example system for forming an additively manufactured component by fused filament fabrication of a material including a metal or alloy powder and a binder.

The disclosure generally describes techniques for forming additively manufactured components such as vacuum insulators using fused filament fabrication. Additive manufacturing of metal or alloy components may present unique challenges, for example, compared to additive manufacturing of polymeric components. For example, while techniques such as powder bed fusion (including direct metal laser sintering, electron beam melting, selective laser sintering, or the like) which use a directed energy beam to fuse and sinter material may be useful in additive manufacturing, some alloys may respond to energy beams in a manner that may not be conducive to localized melting or localized sintering. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients.

In some examples, a material including a sacrificial binder and a powder including metal or alloy dispersed in the binder may be deposited using fused filament fabrication to form an additively manufactured component. After additively forming one or more layers of the component, or after forming the entire component, the binder may be selectively removed or sacrificed from the layers or the component, for example, using heating, chemical dissolution, or the like. Sacrificing the binder from the layers or the component may leave substantially only the powder in the layers or the component. The component may be further treated, for example, by sintering, to strengthen or densify the powder and form the additively manufactured component. By using the material including the sacrificial binder and the powder, removing the sacrificial binder, and sintering the powder, high-melt temperature alloys may be used, residual (free) powder may be reduced, and crack propensity may be reduced due to the absence of melting. Further, microstructure of the additively manufactured component may be more carefully controlled by controlling microstructure of the powder and avoiding melting of the powder during processing.

As will be described herein, a fused filament fabrication process may be employed to form a vacuum insulator, e.g., on a pre-existing component or during the additive manufacturing of a larger overall component including the vacuum insulator. The vacuum insulator may include two layers (or "double walls") with an open cavity between the layers that defines a vacuum environment. One or more internal support structures, such as pedestals or struts, may be located within the open cavity to support the opposing layers depending on the size of the vacuum insulator. In some examples, a system may employ a vacuum insulator to thermally insulate two different thermal environments from each other. For example, a vacuum insulator may be located between a relatively high temperature environment and a relatively low temperature environment to thermally insulate the two environments from each other. Because of the vacuum environment within the cavity, a vacuum insulator may exhibit low thermal conductivity, and a relatively low amount of heat may be conducted across the vacuum insulator from the high temperature environment to the low temperature environment. Convective heat transfer across the vacuum environment may also be relatively low, thus reducing heat transfer across the vacuum.

The FFF process may including controlling the deposition of a filament including a binder and powder to form an unsintered, near net shape article. The binder may be removed, and the powder may be sintered to form the opposing layers of the vacuum insulator and the support structures between the two layers. The FFF process may allow for the shape, size, and/or composition of the vacuum insulator to be tailored, e.g., based on the desired application for the vacuum insulator. In some examples, the dimensions of the open cavity between the two layers of the vacuum insulator may be relatively small. As such, additively manufacturing a vacuum insulator with a FFF process may be advantageous since there may not be any residual powder residue left in the open cavity following the FFF process, e.g., as compared to a powder bed fusion process. Additionally, the FFF process may allow for relatively small internal support members to be formed within the open cavity, which may be difficult or not practical using a powder bed fusion process or other fabrication process.

In some examples, the vacuum insulator may be additively manufactured to be integral with one or more other components. For example, an additively manufactured component may be formed to include the vacuum insulator as a portion of the part during the manufacturing process (e.g., FFF process) rather than the vacuum insulator being added after the component is manufactured. In some examples, the vacuum insulator may be added to a pre-existing part, e.g., by depositing a filament onto a surface of the existing part to form the vacuum insulator by a FFF process. In some examples, one or more walls or other portions of the preexisting part may define a wall of the vacuum insulator such that only the support members and an opposing layer of the vacuum insulator may be formed by the FFF process. In other examples, all the layers and support members of the vacuum insulator may be formed by a FFF process and then integrated with one or more existing components (e.g., between surfaces of neighboring components or between a component and an external environment) in an area in which thermal insulation is desired.

The FFF process may allow for a variety of different materials to be used for the vacuum insulator, e.g., as the powder in the deposited filament, without requiring the material to be melted as part of the FFF process. In some examples, the particular materials selected for all or a portion of the vacuum insulator may be selected based on the desired application and/or environment the vacuum insulator will be utilized. In some examples, the layer(s) and/or support structures of the vacuum insulator may include a material that is highly reflective to radiative heat, e.g., to reduce radiative heat transfer across the insulator. Additionally, or alternatively, the layer(s) and/or support structures of the vacuum insulator may include a material that has a relatively low thermal conductivity, e.g., to reduce the amount of heat transferred through the layers and support structures.

FIG. 1 is a conceptual block diagram illustrating an example fused filament fabrication system 10 for performing fused filament fabrication to form an additively manufactured component including a powder and a binder by filament delivery. As described herein, in some examples, system 10 of FIG. 1 may be used to form an example vacuum insulator, such as those described below with regard to FIGS. 2-6. Additive manufacturing system 10 may include computing device 12, filament delivery device 14, enclosure 32, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening or melting point of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the metal or alloy powder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, each filament may include a metal or alloy powder and a binder configured to bind the metal or alloy powder in filament 20.

The metal or alloy powder may include any suitable metal or alloy for forming an additively manufactured component. In some examples, the metal or alloy powder include a high-performance metal or alloy for forming component used in mechanical systems, such as a steel (e.g., stainless steel), a nickel-based alloy, a cobalt-based alloy, a titanium-based alloy, or the like. In some examples, the metal or alloy powder may include one or more refractory metals such as, e.g., Ti, V, Cr, Mn, Zr, Nb, Mo, Tc, Ru, Rh, Hf, Ta, W, Re, Os, and Ir. In some examples, refractory metals may have a high melting temperature making them undesirable, impractical or not useable in a powder bed fusion process. In some examples, the powder may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof. In some examples, the metal or alloy powder may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy powder may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wi.

In some examples, in addition to a metal or alloy powder, the powder may include a ceramic, such as an oxide. For example, the powder may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

In some examples, the powder of filament 20 may include a ceramic, e.g., as an alternative to a metal or alloy powder. In some examples, the powder may include a ceramic, such as a nitride, carbide, or oxide, or carbon. Suitable ceramic materials include, for example, a silicon-containing ceramic, such as silica ($SiO_2$), silicon carbide (SiC), and/or silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples, the ceramic functions as a reinforcement material in a final component formed from the filament. The powder thus may include continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like, within filament 20. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

Filament 20 also includes a sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The metal or alloy powder may be dispersed in the sacrificial binder, for example substantially uniformly dispersed in the sacrificial binder.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filaments 24 are extruded and/or after softened filaments 24 are laid down in roads 26 to form a material including the metal or alloy powder dispersed in the sacrificial binder, for example substantially uniformly dispersed in the sacrificial binder. The curable polymer precursor may include a precursor, for example, one or more monomers, oligomers, or non-crosslinked polymers suitable for forming the polymeric material of the sacrificial binder upon curing. Thus, in some examples, energy source 25 may direct energy at a curable polymer precursor, for example, in the material, to selectively cure the curable polymer precursor to form roads 26 including the material that includes the metal or alloy powder and the sacrificial binder. In other examples, the heat to which the composition is exposed to form softened filaments 24 may initiate the curing reaction, and no additional energy source is used.

Filament 20 includes a selected amount of sacrificial binder and metal or alloy powder so that the material in roads 26 may include more than about 80% by volume of the metal or alloy powder, which may result in a substantially rigid component with reduced porosity being formed in response to removal of the sacrificial binder. In some examples, filament 20 includes sacrificial binder in an amount configured to cause the material to shrink by less than about 20 volume percent relative to an initial volume of the material in response to removing the sacrificial binder. For example, filament 20 may include less than about 20% by volume of the sacrificial binder.

In some examples, filament 20 includes at least one shrink-resistant agent. For example, the at least one shrink-resistant agent may include a ceramic, instead of, or in addition to, the oxide in any ODS present in the material(s).

Figure 2:
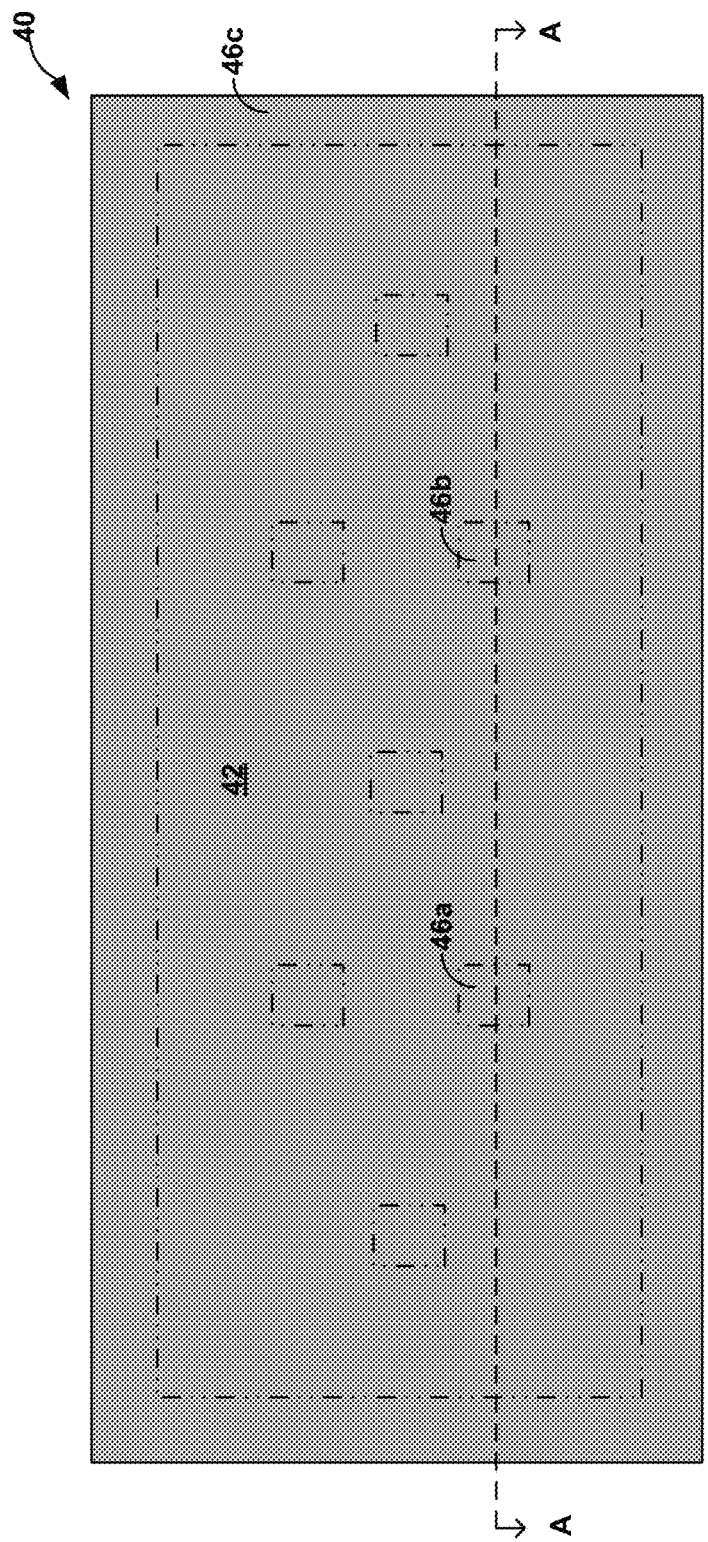
FIG. 2 is a schematic diagram illustrating a plan view of an example vacuum insulator.
Figure 3:
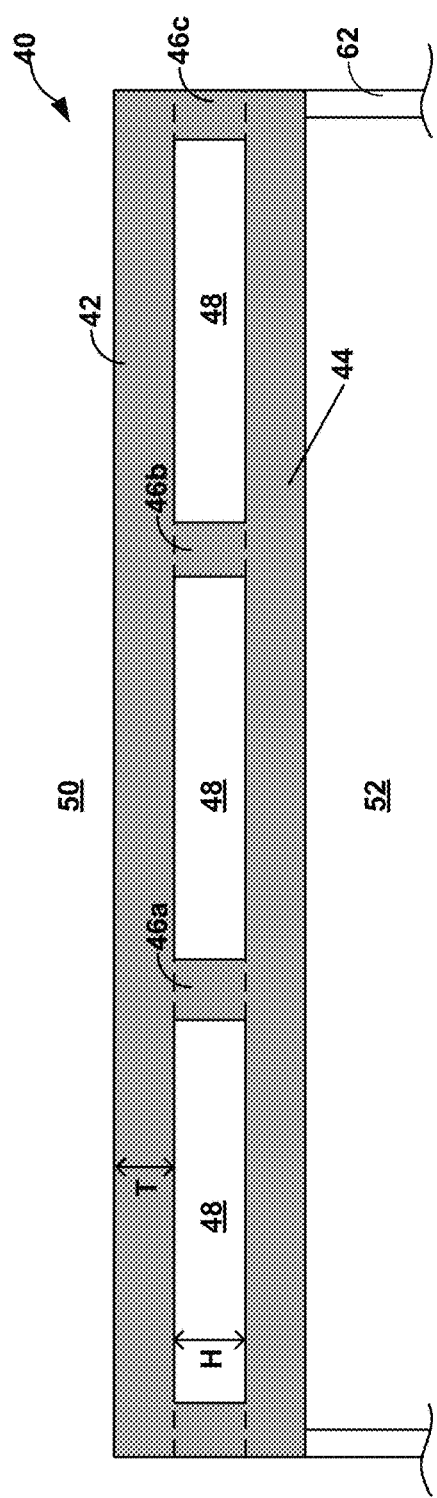
FIG. 3 is a diagram illustrating an example cross-sectional view of the example vacuum insulator of FIG. 2 along cross-section A-A.

FIG. 2 is a schematic diagram illustrating a plan view of an example vacuum insulator 40 in accordance with an example of the disclosure. FIG. 3 is a schematic diagram illustrating a cross-sectional view of vacuum insulator 40 along cross-section A-A in FIG. 2. As shown in FIG. 3, vacuum insulator 40 separates first thermal environment 50 from second thermal environment 52 to thermally insulate the two environments from each other. For example, first thermal environment 50 may have a relatively low temperature and second thermal environment 52 may have a relatively high temperature, and thermal insulator 40 may insulate first thermal environment 50 from second thermal environment 52 by reducing or substantially preventing heat transfer from the second thermal environment 52 to first thermal environment. While examples of the disclosure are primarily described with regard to first environment 50 having a relatively low temperature and second thermal environment 52 having a relatively high temperature, it is contemplated first environment 50 may have a higher temperature than second environment 52 with vacuum insulator 40 operating to reduce or prevent heat transfer from first environment 50 to second environment.

As shown in FIGS. 2 and 3, vacuum insulator 40 includes first layer 42, second layer 44, and a plurality of support members 46 (some of which are individually labelled as members 46a, 46b, and 46c) between layers 42 and 44. Each of first layer 42 and second layer 44 may include one "layer" or more than one "layer" of roads of filament 24 when a FFF process is used to form each of layer 42 and 44. In the examples of FIGS. 2 and 3, support member 46c runs around the outer perimeter of layers 42 and 44 which, in combination with layers 42 and 44, defines open cavity 48. Open cavity 48 may define a substantially vacuum environment. The vacuum environment within open cavity may have a very low pressure or may be a total vacuum.

Some of the support members 46, such as support members 46a and 46b, are located within open cavity 48 defined by support member 46a and layers 42 and 44. The internal support members may provide structural support between layers 42 and 44, e.g., in cases in which layers 42 and 44 are not able to span the entire area within the outer boundary defined by support member 46a without potentially collapsing into open cavity 48. In other examples, vacuum insulator 40 may include layers 42 and 44 separate by support member 46c on the outer perimeter without any internal support members such as members 46a and 46b.

Vacuum environment within open cavity 48 may provide for a relatively low amount of conductive and/or convective heat transfer between layers 42 and 44 and, thus, between first environment 50 and second environment 52.

As described herein, first layer 42, second layer 44, and/or support members 46 may be formed by a FFF process. For example, a filament such as filament 24 may be deposited, where the filament includes a binder and powder. After deposition of all or a portion of first layer 42, second layer 44, and/or support members 46, the binder may be sacrificed, and the remaining powder may be sintered.

First layer 42, second layer 44, and support member 46c may define a boundary for open cavity 48 so that cavity 48 may define a vacuum environment. For example, first layer 42, second layer 44, and support member 46c may define a substantially hermetic boundary around open cavity 48. In some examples, first layer 42, second layer 44, and support member 46c may be substantially non-porous or may have a low porosity (e.g., a porosity of less than approximately 5%, such as, less than 2% or 1% or less.

First layer 42, second layer 44 and support members 46 may have any suitable composition. The composition of first layer 42, second layer 44 and support members 46 may be define by the filament, e.g., the composition of the powder, used in the FFF process to form vacuum insulator 40. First layer 42, second layer 44 and support members 46 may be formed of any of the powder materials described herein although other materials are contemplated.

In some examples, the first layer 42, second layer 44, and support members 46 may have substantially the same composition. In other examples, one or more of first layer 42, second layer 44, and support members 46 may have different compositions than each other. For example, first layer 42 may have a first composition, second layer 44 may have a second composition and support members 46 may have a third composition. Or first layer 42 and second layer 44 may have substantially the same composition and support members 46 may have a different composition.

Additionally, first layer 42, second layer 44 and support members 46 may each have varying composition within their respective volumes. For example, as will be described further below, first layer 42 and/or second layer 44 may include one or more sublayers or subsections, where the different sublayers or subsections have different compositions. As another example, support members 46a and 46b may have a different composition than that of support member 46c. Individual members, such as, support member 46a, of support members 46 may have differing compositions within their volume or may have a substantially uniform composition throughout their volume.

First layer 42 and second layer 44 may be formed of one or more metals and/or alloys, such as those metals and alloys described herein. Additionally, or alternatively, first layer 42 and second layer 44 may be formed of one or more ceramics, such as those ceramics described herein.

In some examples, the composition of first layer 42 may be selected to be compatible (e.g., chemically compatible) with first environment 50. Likewise, the composition of second layer 44 may be selected to be compatible (e.g., chemically compatible) with second environment 52. For example, in cases in which first environment 50 is defined by a solid material (e.g., as opposed to a gas environment), first layer 42 may be formed of a material that has substantially the same coefficient of thermal expansion as that of first environment 50.

In some examples, all or a portion of first layer 40 and/or second layer 42 may be formed of a material that has a relatively high reflectivity to thermal radiation to that layers 40 and/or 42 reduce or otherwise prevent radiative heat transfer between first environment 50 and second environment 52. For example, first layer 40 and/or second layer 42 may be formed of gold, copper, and/or silver.

Support members 46 may be formed of one or more metals and/or alloys, such as those metals and alloys described herein. Additionally, or alternatively, support member 46 may be formed of one or more ceramics, such as those ceramics described herein.

In some examples, support member 46 may have a relatively low thermal conductivity, e.g., to prevent conducting heat between first layer 42 and second layer 44.

In some examples, the internal support member (e.g., members 46a and 46b) may be formed of a material that is different from support member 46 that forms the outer wall of open cavity 48, e.g., since the outer support member may form the boundary to keep the vacuum environment within the vacuum cavity while that may not be a consideration for the internal support members.

Layers 42 and 44 may have any suitable thickness (labeled in FIG. 3 as thickness T for second layer 44), which may be a uniform or nonuniform thickness. The thickness of first layer 42 may be the same or different than second layer 44. Support members 46 may have a thickness that defines the height H of open cavity 48, which may be uniform or nonuniform. It may be desirable to support member 46 to cover only a relatively small percentage of the surface of first layer 42 and second layer 44, e.g., to reduce heat conducted through members 46.

In some examples, each of first layer 42 and second layer 44 may be formed by a FFF process in which the materials for those layers are formed by depositing a filament, such as filament 24, where the binder is subsequently sacrificed, and the powder is sintered. In other examples, first layer 42 and/or second layer 44 may be a portion of a pre-existing component onto which the filament is deposited. For example, in the example of FIG. 3, second layer 44 may be a portion of component 62. Component 62, including second layer 44, may be fabricated using an additive manufacturing process or other suitable process. Once component 62 has been formed, support members 46 and first layer 42 may be formed on second layer 44 using a FFF process. In this manner, vacuum insulator 40 may be formed on pre-existing components, e.g., in areas in which thermal insulation of second environment 52 from first environment 50 is desired.

Figure 4:
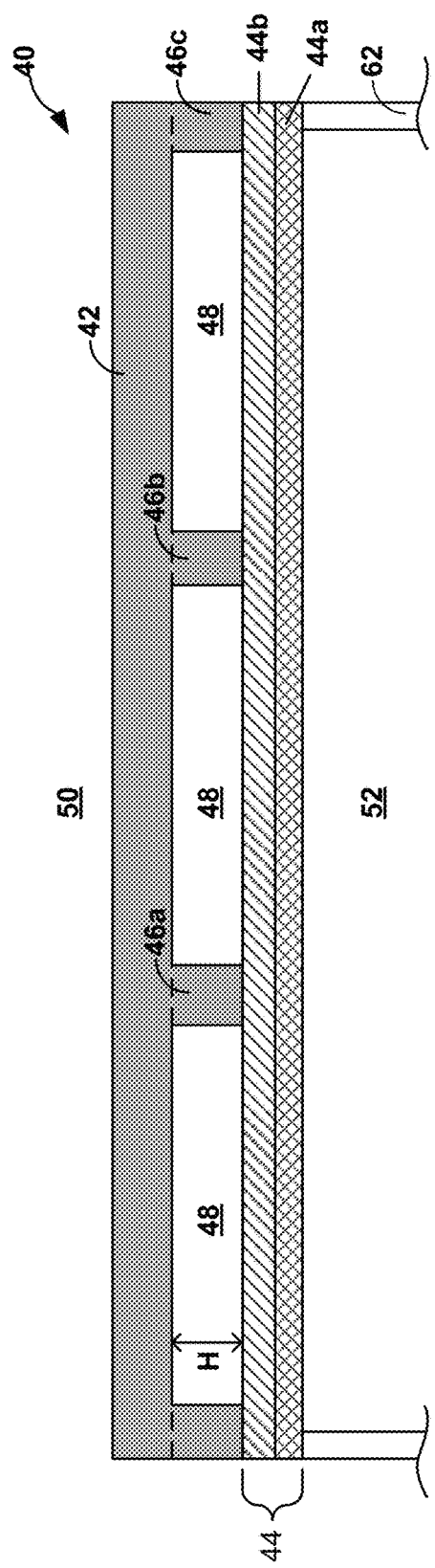
FIG. 4 is a diagram illustrating another example cross-sectional view of the example vacuum insulator of FIG. 2 along cross-section A-A.

In the example cross-section of FIG. 3, first layer 42 and second layer 44 may have a substantially uniform composition throughout the respective components. FIG. 4 is another example of vacuum insulator 40 in which second layer 44 includes sublayers 44a and 44b, which may be portions of second layer 44 with different compositions. In such an example, sublayer 44a may have a composition that is different than sublayer 44b. For example, sublayer 44a may have a composition that is compatible with environment 52 and/or a reflective layer, compared to sublayer 44b which may be formed of a composition that has different properties.

In some examples, both sublayer 44a and sublayer 44b may be formed by a FFF process. In some examples, sublayer 44a may a portion of component 62, where component 62 is a prefabricated component. In such an example, sublayer 44b (as well as members 46 and first layer 42) may be formed by a FFF process, e.g., by depositing a filament onto the upper surface of sublayer 44a followed by the sacrificing of the binder and sintering of the powder.

Figure 5:
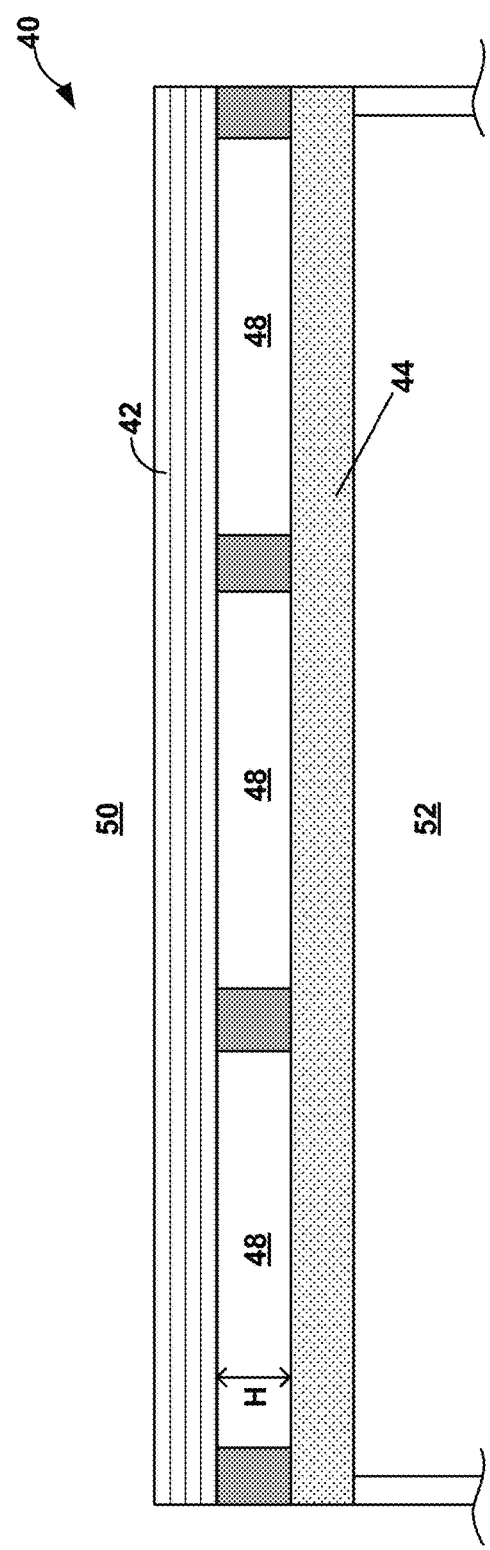
FIG. 5 is a diagram illustrating another example cross-sectional view of the example vacuum insulator of FIG. 2 along cross-section A-A.

FIG. 5 is a cross-section illustrating another example of vacuum insulator 40 in which first layer 42 has a different composition than both of second layer 44 and support members 46, and second layer 44 has a different composition that support member 46. In this manner, first layer 42 may have a composition that is tailored for being adjacent to first environment 50. Likewise, second layer 44 may have a composition that is tailored for being adjacent to second environment 52, and support members 46 may have a composition that is tailored for providing support between first and second layers 42 and 44, as well as defining the outer boundary of open cavity 48, e.g., with support member 46c. Support members 46 may have a relatively low thermal conductivity, e.g., as compared to layers 42 and 44, as support member 46 are the only conductive heat paths between layers 42 and 44.

Figure 6:
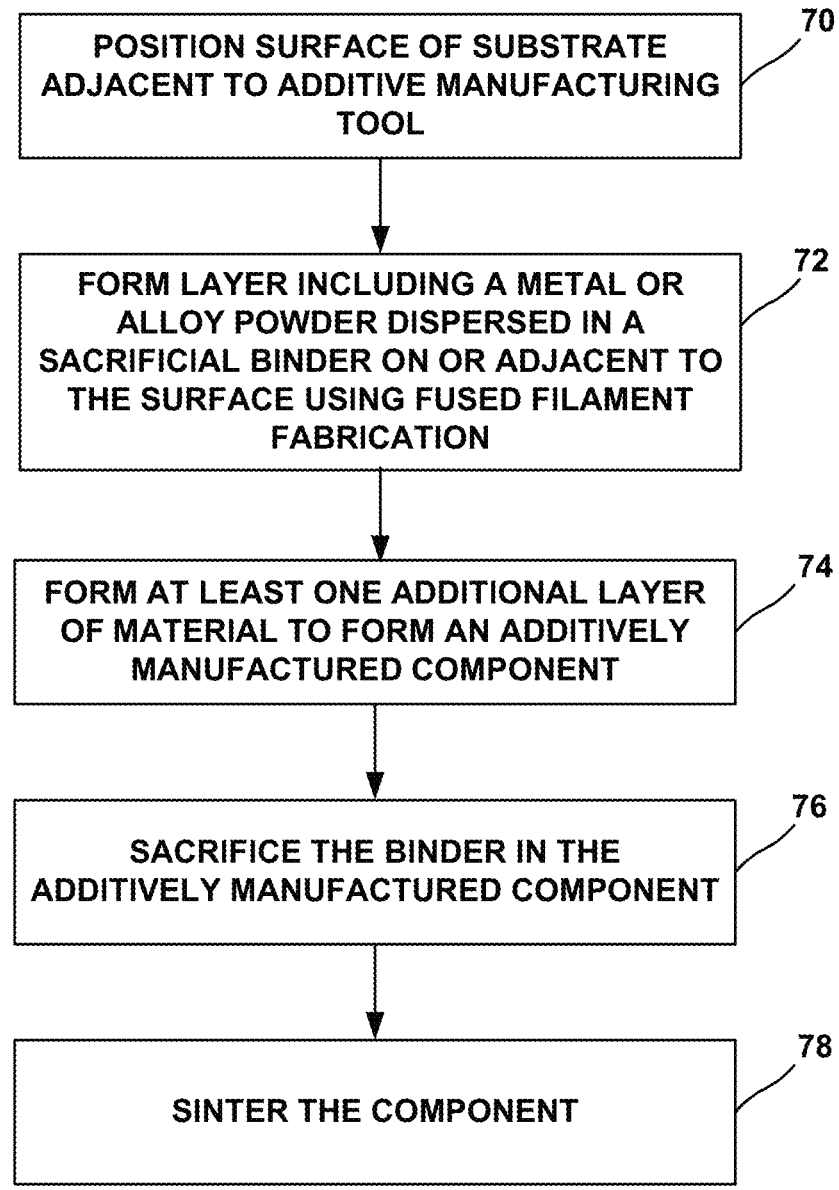
FIG. 6 is a flow diagram illustrating an example technique for forming an additively manufactured component using fused filament fabrication.

The vacuum insulators described herein, such as, vacuum insulator 40, may be formed using an additive manufacturing process such as a FFF process. An example technique that may be implemented by system 10 will be described with concurrent reference to FIG. 6. FIG. 6 is a flow diagram illustrating an example technique for forming an additively manufactured component including at least one feature smaller than a base resolution of the additive manufacturing technique. Although the technique of FIG. 6 is described with respect to system 10 of FIG. 1, in other examples, the technique of FIG. 6 may be performed by other systems, such a system 30 including fewer or more components than those illustrated in FIG. 1. Similarly, system 10 may be used to performed other additive manufacturing techniques.

The technique of FIG. 6 includes positioning substrate 30 including surface 28 adjacent to a build position, e.g., on stage 18 (70). In some examples, system 10 may not include a separate substrate 30, the technique of FIG. 6 may include positioning a build surface defined by stage 18, or by another component, or layers of prior softened filament 24 or another material.

The technique of FIG. 6 also includes forming a road 26 of material using fused filament fabrication (72). Computing device 12 may cause filament delivery device 14 to deposit softened filament 24 in one or more roads 26 to ultimately form the additively manufactured component. A plurality of roads 26 defining a common plane may define a layer of material. Thus, successive roads 26 may define a series of layers, for example, parallel layers, and the series of layers may eventually define the additively manufactured component.

The technique of FIG. 6 also includes forming, on roads 26 of material, at least one additional layer of material to form an additively manufactured component (74). For example, computing device 12 may control movement and positioning of filament delivery device 14 relative to stage 18, and vice versa, to control the locations at which roads are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines an additively manufactured component (74).

The technique of FIG. 6 includes, after forming the additively manufacturing component (74), sacrificing the binder from the component (76). The sacrificing (76) may include delivering thermal or any suitable energy, for example, by energy source 25, to roads 24 in an amount sufficient to cause binder to be substantially oxidized, incinerated, carbonized, charred, decomposed, or removed from roads 24, while leaving the metal or alloy powder substantially intact. In other examples, the additively manufactured component may be placed in a furnace to heat the additively manufactured component and cause removal of the binder from the component (76).

The technique of FIG. 6 also includes, after sacrificing the binder (76), sintering the component (78). The sintering may include a thermal treatment, for example, one or more predetermined cycles of exposure to predetermined temperatures for predetermined times. In some examples, energy source 25 may deliver energy to cause sintering. In other examples, the additively manufactured component may be placed in a furnace to heat the additively manufactured component and cause sintering. In some examples, the sintering (78) may promote the bonding of particles of powder to each other to strengthen the component including substantially only the powder after the binder is sacrificed. Sintering may not melt the particles of powder, thus leaving the microstructure of the particles substantially intact. This may facilitate forming components with selected microstructures compared to techniques that include melting the powder. The sintering (78) may also densify an interior or a surface region of the component, for example, by promoting powder compaction and reducing porosity. In some examples, the steps of removing the sacrificial binder (76)

and sintering the component (78) may be combined in a single heating step or series of heating steps, e.g., within a furnace.

Using the process of FIG. 6, first layer 42, second layer 44, and/or support member 46 of vacuum insulator 40 may be formed. Different compositions with the respective portions of vacuum insulator 40 may be achieved using any suitable technique, e.g., by changing the composition of filament 24 during the deposition process.

In some examples, a sacrificial support structure may be employed in the volume corresponding to open cavity 48 during the deposition of filament 24. For example, once the material for second layer 42 is deposited (e.g., as well as the material for support members 46), a sacrificial support structure may be located in the area of open cavity 48. The material for first layer 42 may then be deposited on the sacrificial support structure along with the material of support members 46 to support the material of first layer 42, e.g., until the binder is removed and/or the material is sintered as described above. The sacrificial support structure material may be sacrificed (e.g., removed) to leave open cavity 48. Any suitable sacrificial support structure may be used. In some examples, the sacrificial support structure is formed of a leachable or dissolvable material that may be leached or dissolved (e.g., in water or liquid) to remove the structure from open cavity 48. In other examples, the sacrificial support structure may be formed of a thermally removable material that is sacrificed from within open cavity 48 when exposed to high temperatures, e.g., during sintering (78) or the sacrificing of binder from filament 24 (76) described above.

A vacuum environment may be formed in the volume of open cavity 48 during the process to fabricate vacuum insulator 40 using any suitable technique.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following clauses and claims.

Clause 1. A method of forming a vacuum insulator, the method comprising: forming an article including a first layer, a second layer, and at least one support member extending between the first and second layer by depositing a filament via a filament delivery device, wherein the filament includes a sacrificial binder and a powder, and wherein the first layer, second layer, and at least one support member define an open cavity within the article; removing substantially all the binder; and sintering the article to form the vacuum insulator, wherein the vacuum insulator defines a substantially vacuum environment in the cavity.

Clause 2. The method of clause 1, wherein the powder comprises a metal or alloy powder.

Clause 3. The method of clause 1 or clause 2, wherein the first layer has a first composition and the second layer has a second composition different form the first composition.

Clause 4. The method of any one of clauses 1-3, wherein the at least one support structure has a third composition different from the first layer and the second layer.

Clause 5. The method of any one of clauses 1-4, wherein the first layer and the second layer are separated by a gap in the open cavity, where the gap has a thickness greater than a thickness of the first layer and the second layer.

Clause 6. The method of any one of clauses 1-5, wherein the first layer includes a first sublayer and a second sublayer having a different composition than the first sublayer.

Clause 7. The method of any one of clauses 1-6, wherein the substantially vacuum environment in the cavity defines a pressure of less than the pressure of an environment outside the first layer and the second layer.

Clause 8. The method of any one of clauses 1-7, wherein the forming the article includes: depositing the filament adjacent a substrate defining the first layer to form the at least one support members, and depositing the filament adjacent the at least one support members to form the second layer.

Clause 9. The method of any one of clauses 1-8, further comprising removing substantially all of the binder from the article prior to sintering the article.

Clause 10. The method of any one of clauses 1-9, wherein forming an article comprises forming a sacrificial support structure on the first layer; depositing the filament on and around the sacrificial support structure to form the at least one support member and second layer; and removing the sacrificial support structure to form the open cavity within the article.

Clause 11. An additively manufactured vacuum insulator comprising: a first layer; a second layer; at least one support member extending between the first and second layer, wherein a cavity is between the first layer and the second layer, wherein a substantially vacuum environment is defined in the cavity.

Clause 12. The vacuum insulator of clause 11, wherein the first layer, second layer, and at least one support member are formed of a sintered metal or alloy powder.

Clause 13. The vacuum insulator of clause 11 or clause 12, wherein the first layer has a first composition and the second layer has a second composition different form the first composition.

Clause 14. The vacuum insulator of any one of clauses 11-13, wherein the at least one support structure has a third composition different from the first layer and the second layer.

Clause 15. The vacuum insulator of any one of clauses 11-14, wherein the first layer and the second layer are separated by a gap in the open cavity, where the gap has a thickness greater than a thickness of the first layer and the second layer.

Clause 16. The vacuum insulator of any one of clauses 11-15, wherein the first layer includes a first sublayer and a second sublayer having a different composition than the first sublayer.

Clause 17. The vacuum insulator of any one of clauses 11-16, wherein the substantially vacuum environment in the cavity defines a pressure of less than the pressure of an environment outside the first layer and the second layer.

Clause 18. The vacuum insulator of any one of clauses 11-17, wherein the vacuum insulator is formed by: depositing a filament adjacent a substrate defining the first layer to form the at least one support members, the filament including a powder and binder; and depositing the filament adjacent the at least one support members to form the second layer; removing substantially all of the binder; and sintering the vacuum insulator.

Clause 19. The vacuum insulator of any one or clauses 11-18, wherein the vacuum insulator is formed by: forming a sacrificial support structure on the first layer; depositing a filament on and around the sacrificial support structure to form the at least one support member and second layer; and removing the sacrificial support structure to form the open cavity within the article.

Clause 20. An additive manufacturing system comprising: a substrate defining a major surface; a filament delivery device; and a computing device configured to: control the filament delivery device to form an article including a first layer, a second layer, and at least one support member extending between the first and second layer, wherein the filament includes a sacrificial binder and a powder, and wherein the first layer, second layer, and at least one support member define an open cavity within the article; wherein the binder is configured to be removed from the article, and the article sintered to form a vacuum insulator, wherein the vacuum insulator defines a vacuum environment in the cavity.

Clause 21. An additive manufacturing system comprising: a substrate defining a major surface; a filament delivery device; and a computing device configured to perform one or more of the methods described in the disclosure or the method of clauses 1-10.

What is claimed is:

1. A method of forming a vacuum insulator, the method comprising:
    forming an article including a first layer, a second layer, and at least one support member extending between the first and second layer by depositing a filament via a filament delivery device, wherein the filament includes a sacrificial binder and a powder, and wherein the first layer, second layer, and at least one support member define an open cavity within the article,
    wherein the at least one support members includes an internal support member located within the open cavity and another support member that forms an outer wall of the open cavity, wherein the internal support member is formed of a first material and the another support member is formed of a second material different than the first material;
    removing substantially all the binder; and
    sintering the article to form the vacuum insulator, wherein the vacuum insulator defines a substantially vacuum environment in the cavity.

2. The method of claim 1, wherein the powder comprises a metal or alloy powder.

3. The method of claim 1, wherein the first layer has a first composition and the second layer has a second composition different from the first composition.

4. The method of claim 1, wherein the first layer and the second layer are separated by a gap in the open cavity, where the gap has a thickness greater than a thickness of the first layer and the second layer.

5. The method of claim 1, wherein the first layer includes a first sublayer and a second sublayer having a different composition than the first sublayer.

6. The method of claim 1, wherein the substantially vacuum environment in the cavity defines a pressure of less than the pressure of an environment outside the first layer and the second layer.

7. The method of claim 1, wherein the forming the article includes:
    depositing the filament adjacent a substrate defining the first layer to form the at least one support members, and
    depositing the filament adjacent the at least one support members to form the second layer.

8. The method of claim 7, wherein the substrate defining the first layer is a preexisting part not formed by deposition of a filament.

9. The method of claim 1, further comprising removing substantially all of the binder from the article prior to sintering the article.

10. The method of claim 1, wherein forming an article comprises:
    forming a sacrificial support structure on the first layer;
    depositing the filament on and around the sacrificial support structure to form the at least one support member and second layer; and
    removing the sacrificial support structure to form the open cavity within the article.

11. The method of claim 1, wherein the first material of the internal support member includes a ceramic, and wherein the second material of the another support member includes a metal or alloy.

12. The method of claim 1, wherein the internal support member has a first thermal conductivity that is less than a second thermal conductivity of the another support member.

13. The method of claim 1, wherein the another support member formed of the second material defines a substantially hermetic boundary of the open cavity.

14. The method of claim 1, wherein the another support member is formed of a same material as at least one of the first layer or the second layer, and wherein the internal support member is formed of a different material as the as least one of the first layer and the second layer.

15. The method of claim 1, wherein the internal support member has a first porosity that is greater than a second porosity of the another support member.

16. The method of claim 15, wherein the second porosity is less than approximately 5 percent.

17. The method of claim 1, wherein the first layer is adjacent to a solid material, wherein the first layers is formed of a material that has substantially the same coefficient of thermal expansion as that of the solid material.

18. The method of claim 1, wherein the second layer has an internal surface facing the open cavity, wherein the internal surface of the second layer is defined by a first sublayer of the second layer, wherein the first sublayer is defined by a first material that has a high reflectivity to radiative heat, wherein the second layer includes a second sublayer that defines an outer surface of the second layer that is opposite the open cavity, and wherein second sublayer is formed of a second material that has a lower reflectivity to radiative heat compared o the first material of the first sublayer.

19. The method of claim 1, wherein the first layer includes a first sublayer formed by depositing the filament via the filament delivery device, and wherein the first layer includes a second sublayer that is a prefabricated portion not formed by depositing the filament via the filament delivery device.

20. The method of claim 1, wherein the filament includes a first filament including the first material and a second filament including the second material, wherein forming the article comprises:
  depositing the first filament on the first layer for the internal support member; and
  depositing the second filament on the first layer for the another support member.

* * * * *